Sept. 8, 1942.　　　J. J. ROTHWELL　　　2,295,237
TIRE INFLATER
Filed Nov. 4, 1940　　　2 Sheets-Sheet 1

Inventor:
John J. Rothwell
BY Bair & Freeman
Attys.

Sept. 8, 1942.                J. J. ROTHWELL                 2,295,237
                                TIRE INFLATER
                           Filed Nov. 4, 1940              2 Sheets-Sheet 2

Inventor:
John J. Rothwell,
BY Bair & Freeman
Attys.

Patented Sept. 8, 1942

2,295,237

UNITED STATES PATENT OFFICE 2,295,237

TIRE INFLATER

John J. Rothwell, Elkhart, Ind., assignor to Penn Electric Switch Co., Goshen, Ind., a corporation of Iowa Application November 4, 1940, Serial No. 364,274

6 Claims. (Cl. 221—73.5)

My invention relates to a tire inflater wherein means is provided to prevent cycling of the type of tire inflator which charges a tire by "shots" or in cycles.

One object of the invention is to provide a simple, durable and inexpensive means which can be readily applied to the type of tire inflater shown in Shaw patent, No. 2,194,129, to support the tire hose and utilize the weight of the hose as a means to prevent cycling of the tire inflater.

More particularly, it is my object to provide means to lock the mechanism of the tire inflater against cycling whenever the tire hose is hung on a hook or other support, the support in turn operating as a stop means for the mechanism of the inflater.

Other objects, purposes and characteristic features of the present invention will be in part obvious from the accompanying drawings and in part pointed out as the description of the invention progresses. In the detailed description of the invention, reference will be made to the accompanying drawings wherein like reference characters designate corresponding parts throughout the several views thereof.

Figure 2:
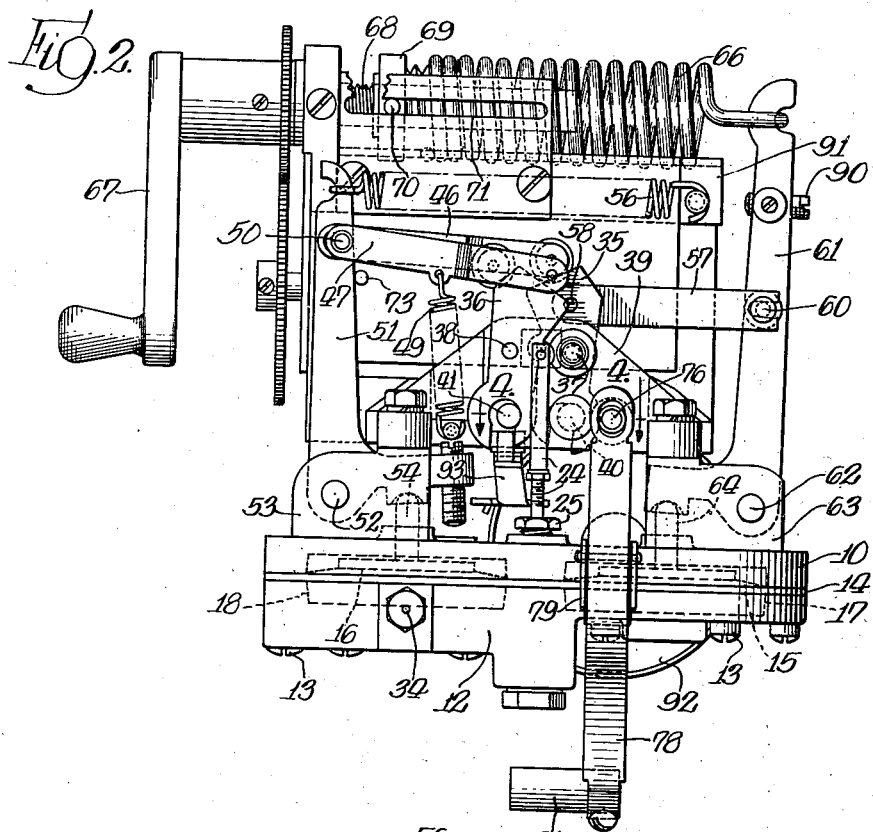
Figure 2 is a front elevation of the tire inflater omitting the casing and viewed from the right side of Figure 1.
Figure 3:
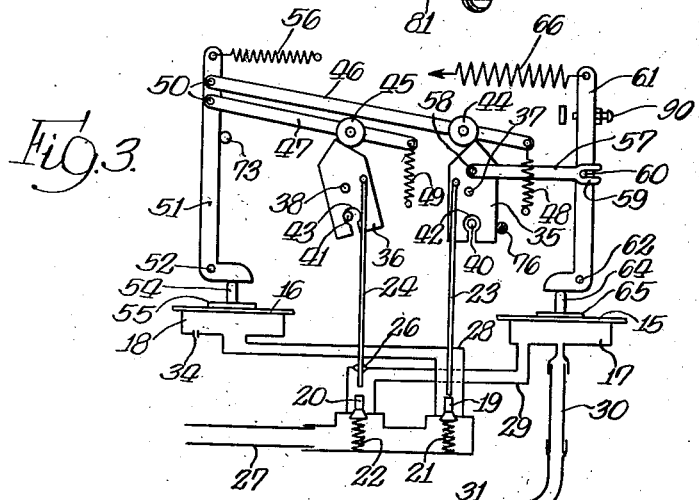

Figure 3 is a diagrammatic view illustrating the various elements of the tire inflater in their relation to each other, together with my stop mechanism cooperating therewith to facilitate description of the operation of the inflater and the stop mechanism, and Figure 4 is an enlarged sectional view on the line 4—4 of Figure 2 showing further details of coaction between parts of the tire inflater and my improvement.

The tire inflater includes a base plate 10 and a cover plate 12 therefor. The base plate and cover plate are assembled relative to each other as by screws 13, with a sheet of rubber or other suitable flexible composition 14 interposed between them. The sheet 14 serves as a gasket between the plates and as cycling and gauging diaphragms indicated at 16 and 15, respectively. The cover plate 12 is provided with a pair of recesses 18 and 17 forming, respectively, a cycling diaphragm chamber and a gauging diaphragm chamber.

Referring to Figure 3, a cycling valve 19 and an air admission valve 20 are provided. Springs 21 and 22 bias the valves 19 and 20 to a normally seated position as illustrated.

For operating the valves 19 and 20, stems 23 and 24 are provided. A packing nut 25 is adapted to retain packing 26 in the base plate 10 surrounding the stem 24.

An inlet conduit 27 communicates with the inlet sides of the valves 19 and 20 and is adapted to receive compressed air from a compressed air tank or the like as generally found at an automobile service station. Connections 28 and 29 serve as a means of communication between the cycling valve 19 and the cycling diaphragm chamber 18, and between the gauging valve 20 and the gauging diaphragm chamber 17, respectively. The gauging diaphragm chamber 17 has an outlet pipe 30 with which is connected a tire hose 31. On the outer end of the tire hose the usual tire chuck 32 is provided with a self contained check valve 33 for coaction with the tire valves of automobile tires to be serviced. The cycling diaphragm chamber 18 is provided with a vent opening 34 to atmosphere.

Connected with the stems 23 and 24 are V cam levers 35 and 36 pivotally supported at 37 and 38, respectively, in an upstanding fin 39 of the base plate 10. The pivotal connection is such that the cam levers 35 and 36 permit the valves 19 and 20 to close when the pivotal connections of the stems 23 and 24 to the cam levers move upwardly. Opening of the valves is effected when the pivotal connections move downwardly by counterclockwise and clockwise rotation, respectively, of the cam levers 35 and 36. The cam levers 35 and 36 are limited in their swinging motion by stop pins 40 and 41 received in enlarged openings 42 and 43 of the cam levers.

The cam levers 35 and 36 are adapted to be operated by cam rollers 44 and 45 carried by links 46 and 47 and held in engagement with the cam surfaces on the upper ends of the levers by springs 48 and 49. The links 46 and 47 are connected by a pivot pin 50 (two of which are shown diagrammatically in Figure 3 to simplify the showing) carried by a cycling bell crank 51. The bell crank 51 is pivoted on a pin 52 supported by a boss 53 extending upwardly from the base plate 10. The short end of the bell crank lever 51 is held in contact with a follower pin 54 of a follower plate 55 pressed against the cycling diaphragm 16 by a cycling spring 56.

In addition to the roller 44, a link 57 is provided for operating the cam lever 35. One end of the link 57 is pivoted at 58 to the cam lever and the other end has a slot 59 straddling a headed pin 60 extending from a second bell crank lever 61. The lever 61 is pivoted on a pin 62 carried by a boss 63 of the base plate 10. The short end of the bell crank lever 61 engages a follower pin 64 of a diaphragm follower 65 which is held in contact with the gauging diaphragm 15 by an adjusting or range spring 66.

For adjusting the spring 66, a crank 67, a threaded rod 68 and a nut 69 are provided. The nut 69 is mounted in one end of the spring 66 and has a pin 70 traversing a slot 71 to permit longitudinal, but prevent rotational, movement of the nut 69 when the adjusting crank 67 is rotated. The rod 68 of course is fixed relative to the crank 67 and there-rotates relative to the nut 68.

The tire inflater thus far described is supported in a casing C having a back cover plate 72. Dial mechanism, indicated generally at 74, is adapted to be operated by the crank 67 to indicate the setting for the tire inflater when adjusted for any desired pressure to be delivered by the tire chuck 32. The dial mechanism 74 may be observed through a transparent cover or insert 75 in the casing C.

My specific improvement includes the mechanism which will now be described. A stop pin 76 is slidable in a boss 77 of the fin 39. The stop pin is positioned as shown in Figure 4, so that normally it is in the full line position, but at times may assume the dotted position for preventing further movement of the cam lever 35 toward the right as viewed in Figure 4.

A bell crank lever 78 is pivoted in ears 79 extending from the base plate 10. The upper end of the lever 78 loosely receives a portion of the pin 76 between a pair of stop washers 80 thereon. The lower end of the bell crank lever 78 is provided with a weight 81 projecting to a point where it may be engaged by a tire hose supporting hook 82 when it is in the solid line raised position of Figure 1.

The tire supporting hook 82 is pivoted at 83 to a bracket 84 and is normally biased to its raised position by a spring 85. One end of the spring 85 is anchored to a rivet 86 through the casing C, and the other end thereof is connected with a perforated ear 87 of the tire supporting hook 82. The hook 82 has a stop extension 88 engageable with a stop shoulder 89 of the casing C.

*Practical operation*

Referring to Figure 3, the tire chuck 32 when connected to a tire allows air to pass to the tire if the pressure in the tire is less than the setting of the range spring 66. Reduction of pressure against the gauging diaphragm 15 causes the bell crank 61 to swing counterclockwise, pushing the V cam 35 counterclockwise so that its point passes under the roller 44. This is accomplished by the link 57 actuated through the slot and pin connection 59—60 from the lever 61 and actuating the lever 35 through the pin 58. Such operation occurs only if the pressure against the diaphragm 15 is lowered to less than the setting of the range spring 66.

As a result, the spring 48 pulls the roller 44 downwardly along the right hand incline of the cam lever 35, thus rotating the cam lever counterclockwise and opening the cycling valve 19. Such counterclockwise rotation of the cam lever is permitted by the slot and pin connection at 59—60. Tank pressure from the line 27 then flows past the cycling valve 19 through the connection 28 to the cycling diaphragm chamber 18. The vent at 34 permits escape of the air from under the cycling diaphragm 16, but the escape is restricted so that pressure builds up and the diaphragm flexes upwardly to spring the bell crank 51 counterclockwise away from a stop pin 73 and against the bias of the spring 56.

The roller 45 thereafter passes over the crest of the V cam lever 36, thereby swinging the cam lever clockwise to open the air admission valve 20. Air under tank pressure then passes the valve 20 and flows through the connection 29, gauging diaphragm chamber 17, pipe 30, tire hose 31, tire chuck 32 and check valve 33 to the tire. A time period after the roller 45 passes the crest of the cam lever 36, the roller 44 will pass the crest of the cam lever 35, traveling in a left-hand direction because the bell crank 51 is steadily moving toward the left, due to the pressure being built up under the diaphragm 16. The timing period will be determined by the size of the vent opening 34.

The passage of the roller 44 to the left over the crest of the cam lever 35 causes the cam lever to swing clockwise, thus again closing the cycling valve 19. This stops the flow of compressed air to the cycling diaphragm 16 and the air escapes from the cycling diaphragm chamber 18 through the vent 34 to atmosphere. The resulting reduction in the pressure under the cycling diaphragm permits the bell crank 51 to be rotated clockwise by the spring 56. The rollers 44 and 45 are thereby forced in a right hand direction toward the crests of the cams 35 and 36. The roller 45 first passes the crest of the cam lever 36, whereupon the cam lever is turned counterclockwise and permits the air admission valve 20 to close.

While the valve 20 is open, air flows through the tire chuck 32 to the tire and the pressure under the gauging diaphragm 15 rises above the pressure for which the spring 66 is adjusted. If, after the valve 20 closes, the pressure under the diaphragm 15 decreases to less than the setting of the spring 66, then the diaphragm 15 will be depressed by the spring and the cam lever 35 will swing counterlockwise under the roller 44 to initiate another cycle. The cycles, of course, will be repeated until the tire is satisfied and the pressure will be measured by the diaphragm 16 while the valve 20 is closed.

During the measuring operation, air flow decreases to zero and fluid resistance in the conduit system including the elements 32, 31 and 30 is negligible so that the diaphragm responds accurately to the tire pressure. If the tire pressure does not decrease below the setting of the spring 66, then the bell crank 61 will remain in its clockwise position of Figure 2 with a stop screw 90 thereof spaced from a stop boss 91 and there will be no further shots of air.

After the tire is filled, if the parts 76 to 89 are not provided there is a possibility of the tire inflater continuing to recycle. Such recycling occurs if there is even a slight leak in the hose 31 or any of the parts on the outgoing side of the air admission valve 20. A signal gong 92, actuated by a striker 93, is usually provided, the striker in turn being operated by any movable part of the mechanism, such as the cam lever 36. Such recycling will undesirably ring the gong, in addition to there being waste of air. Accordingly I provide the stop pin 76 which, when the tire hose 31 is hung on the supporting hook 82 (as shown by dotted lines in Figure 1), will be biased toward the dotted position of Figure 4. If the cam lever 35 happens to be swung counterclockwise (to the right in Figure 4, as shown by dotted lines), then the stop pin 76 will merely rest against it under the bias of the weight 81. When during the recycling operation the cam lever 35 swings to the left far enough, then the weight 81 will effect sliding of the stop pin 76 to its dotted position in Figure 4 to prevent any further cycling. Such position is shown in Figure 3, and it will be noted that the cycling valve 19 is in closed position so that there will be no cycling operation. Also, the air admission valve 20 is in its closed position. Even though there is a reduction of pressure in the tire hose 31 to substantially atmospheric pressure, there will be no further cycling of the apparatus since the operating mechanism is held against further movement by the stop pin 76.

Figure 1:
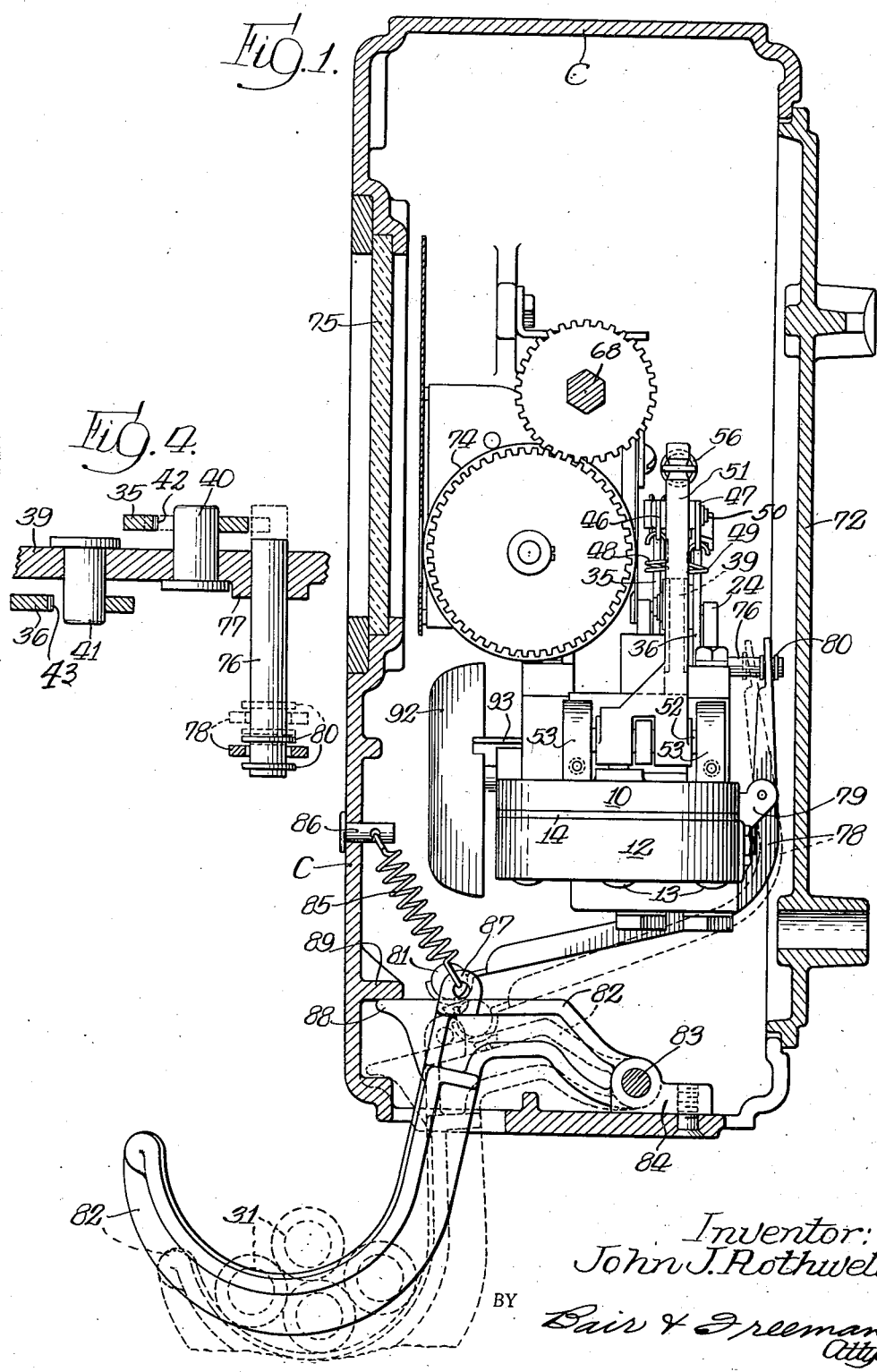
Figure 1 is a vertical sectional view through a tire inflater casing showing the tire inflater therein and my stop mechanism applied thereto.

Subsequently when the hose 31 is removed from the hook 82, the hook will be elevated by the spring 85, thereby actuating the bell crank 78 from the dotted line to the full line position of Figure 1. This pulls the stop pin 76 outwardly to the full line position of Figure 4, so that the tire inflater may operate in its usual manner, as already described.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention and desire to secure by Letters Patent of the United States:

1. In a tire inflater, cycling and gauging diaphragms, chambers therefor, a tire hose connected with said gauging diaphragm chamber, cycling and air admission valves between a source of air supply and said cycling and gauging diaphragms respectively, mechanism for operatively connecting said diaphragms to said valves, said mechanism including a pair of V over roller devices, one of said devices being operable from one position to another by reduction of the air pressure in said tire hose and consequent movement of said gauging diaphragm, a stop pin for said one of said devices before it changes from said one position to said another position, and a supporting hook for said tire hose operatively connected with said stop pin to move it to stop position upon supporting said tire hose on said hook.

2. A tire inflater comprising cycling and gauging diaphragms, chambers therefor, a tire hose connected with said gauging diaphragm chamber, cycling and air admission valves between a source of air supply and said cycling and gauging diaphragms respectively, mechanism for operatively connecting said diaphragms to said valves, said mechanism including a pair of snap acting devices, one of said devices being operable from one position to another by reduction of the air pressure against, and resultant movement of, said gauging diaphragm, a stop pin for said one of said devices before it changes from said one position to said another position, and a movable support for said tire hose operatively connected with said stop pin to move it to stop position upon said tire hose being supported on said support.

3. In a tire inflater, a gauging diaphragm, a chamber therefor, a tire hose connected with said chamber, an air admission valve for said chamber, mechanism for operatively connecting said diaphragm to said valve, said mechanism including a snap acting device, said device being operable from one position to another by movement of said diaphragm due to reduction of the air pressure in said tire hose, a stop pin for said device before it changes from said one position to said another position, and a movable, spring raised support for said tire hose operatively connected with said stop pin to move it to stop position upon supporting the weight of said tire hose on said support.

4. A tire inflater including a gauging diaphragm, a chamber therefor, a tire hose connected with said gauging diaphragm chamber, an air admission valve for said chamber, mechanism for operatively connecting said diaphragm to said valve, said mechanism including a snap acting device which is operated from one position to another position by movement of said diaphragm due to reduction of air pressure in said tire hose, a stop pin for said device before it changes from said one position to said another position, a pivoted arm carrying said stop pin, said arm being weighted to bias the pin toward stop position, a pivoted supporting hook for said tire hose, a spring biasing said hook upwardly, the weight of said tire hose, when on said hook, lowering the hook against such bias, said supporting hook, when the hose is removed therefrom, engaging said pivoted and weighted arm to move said pin to non-stopping position with relation to said device.

5. In a tire inflater apparatus, a pair of diaphragm mechanisms, fluid pressure supply means connected therewith, a tire hose communicating with a chamber for one of said diaphragm mechanisms, said one of said diaphragm mechanisms serving as a gauging diaphragm and the other as a cycling diaphragm, gauging and cycling valves connected respectively with said gauging and cycling diaphragms for supplying compressed air thereto, operating mechanism for said valves including a snap acting device operable from valve closing to valve opening position upon predetermined reduction of air pressure in said tire hose effecting movement of said gauging diaphragm, stop means for said operating mechanism, a tire hose supporting hook, and an operative connection between said hook and said stop means to render the stop means effective when the tire hose is placed on the hook and to render the stop means ineffective when the tire hose is removed from the hook.

6. Tire inflation apparatus comprising a pair of diaphragms, chambers therefor, fluid pressure supply means connected with said chambers, a tire hose connected with one of said chambers, a gauging valve operatively connected with the diaphragm of said one of said chambers for supplying compressed air thereto, the operative connection for said gauging valve including a snap acting device operable from valve closing to valve opening position by said gauging diaphragm as a result of predetermined pressure drop in said one of said chambers, stop means for said snap acting device, a tire hose supporting hook, and an operative connection between said hook and said stop means to render the stop means effective when the tire hose is supported on the hook and to render the stop means ineffective to stop said snap acting device in the position it assumes prior to closure of said valve when said tire hose is removed from said hook.

JOHN J. ROTHWELL.